[12] United States Patent
Mahazri et al.

(10) Patent No.: US 9,872,299 B1
(45) Date of Patent: Jan. 16, 2018

(54) OPTIMIZED TRANSMIT-POWER ALLOCATION IN MULTI-CARRIER TRANSMISSION

(71) Applicant: Marvell International Ltd., Hamilton (BM)

(72) Inventors: Ofir Mahazri, Petach-Tikva (IL); Amit Wix, Petach-Tikva (IL)

(73) Assignee: MARVELL INTERNATIONAL LTD., Hamilton (BM)

( * ) Notice: Subject to any disclaimer, the term of this patent is extended or adjusted under 35 U.S.C. 154(b) by 80 days.

(21) Appl. No.: 14/957,622

(22) Filed: Dec. 3, 2015

Related U.S. Application Data

(60) Provisional application No. 62/089,404, filed on Dec. 9, 2014.

(51) Int. Cl.
*H04W 72/04* (2009.01)
*H04W 52/04* (2009.01)
*H04W 88/02* (2009.01)

(52) U.S. Cl.
CPC ....... *H04W 72/0473* (2013.01); *H04W 52/04* (2013.01); *H04W 72/0406* (2013.01); *H04W 72/0453* (2013.01); *H04W 88/02* (2013.01)

(58) Field of Classification Search
CPC ......... H04W 72/0473; H04W 72/0406; H04W 72/0453; H04W 52/04; H04W 88/02
See application file for complete search history.

(56) References Cited

U.S. PATENT DOCUMENTS 6,512,750 B1   1/2003   Palenius
6,757,319 B1   6/2004   Parsa et al.
(Continued)

FOREIGN PATENT DOCUMENTS

EP   0955736 A2   11/1999
EP   1750407 A1   2/2007
(Continued)

OTHER PUBLICATIONS

Research in Motion, UK Limited, "Uplink Power Control for Carrier Aggregation", 3GPP TSG RAN WG1 Meeting # 57b, 3 pages, Jun. 29-Jul. 3, 2009.
(Continued)

*Primary Examiner* — Habte Mered

(57) ABSTRACT

A method includes, in a wireless communication terminal that transmits a data channel over multiple component carriers, dividing a total transmit-power allocation specified for the data channel into carrier-specific power allocations for the respective component carriers. Block sizes, which specify respective numbers of bits for transmitting the data channel, are initially derived for one or more of the component carriers from a quantized set of block sizes, such that the respective carrier-specific power allocations are not exceeded. For at least a selected component carrier, an extended block size is selected from the quantized set. The extended block size exceeds a carrier-specific power allocation assigned to the selected component carrier, but together with the block sizes of the other component carriers does not exceed the total transmit-power allocation. The data channel is transmitted over the component carriers using the selected block sizes, including the extended block size.

12 Claims, 2 Drawing Sheets

(56) References Cited

U.S. PATENT DOCUMENTS

| | | | |
|---|---|---|---|
| 6,768,727 | B1 | 7/2004 | Sourour et al. |
| 7,184,791 | B2 | 2/2007 | Nilsson et al. |
| 8,099,139 | B1 | 1/2012 | Zaslavsky et al. |
| 8,150,478 | B2 | 4/2012 | Perets et al. |
| 8,320,977 | B2 | 11/2012 | Perets et al. |
| 8,526,889 | B2 | 9/2013 | Pick et al. |
| 8,537,802 | B2 | 9/2013 | Erell et al. |
| 8,743,786 | B2 * | 6/2014 | Johansson ............ H04W 52/146 370/328 |
| 8,831,690 | B2 | 9/2014 | Perets et al. |
| 2001/0019577 | A1 | 9/2001 | Ha |
| 2005/0207367 | A1 * | 9/2005 | Onggosanusi ........ H04L 1/0003 370/315 |
| 2006/0045062 | A1 | 3/2006 | Gorokhov et al. |
| 2006/0274712 | A1 | 12/2006 | Malladi et al. |
| 2007/0110100 | A1 | 5/2007 | Wunder et al. |
| 2007/0141994 | A1 | 6/2007 | Cheng |
| 2007/0149229 | A1 | 6/2007 | Frederiksen et al. |
| 2007/0183591 | A1 | 8/2007 | Geile et al. |
| 2007/0253466 | A1 | 11/2007 | Jones |
| 2007/0259671 | A1 | 11/2007 | Cheng et al. |
| 2008/0081655 | A1 | 4/2008 | Shin et al. |
| 2008/0108365 | A1 | 5/2008 | Buddhikot et al. |
| 2008/0207135 | A1 | 8/2008 | Varadarajan et al. |
| 2008/0229177 | A1 | 9/2008 | Kotecha |
| 2009/0163157 | A1 | 6/2009 | Zolfaghari |
| 2009/0224973 | A1 | 9/2009 | Nayyar |
| 2009/0257533 | A1 | 10/2009 | Lindoff et al. |
| 2009/0258628 | A1 | 10/2009 | Lindoff et al. |
| 2009/0264120 | A1 | 10/2009 | Karabinis |
| 2009/0279480 | A1 | 11/2009 | Rosenqvist et al. |
| 2009/0300456 | A1 | 12/2009 | Pelletier et al. |
| 2009/0316659 | A1 | 12/2009 | Lindoff et al. |
| 2010/0157895 | A1 * | 6/2010 | Pani .................... H04W 52/346 370/328 |
| 2010/0172279 | A1 | 7/2010 | Chen et al. |
| 2010/0197339 | A1 * | 8/2010 | Pedersen ............... H04W 52/34 455/522 |
| 2010/0273520 | A1 * | 10/2010 | Pelletier ............... H04L 5/0007 455/522 |
| 2011/0263281 | A1 * | 10/2011 | Cai ...................... H04B 7/0404 455/501 |
| 2012/0057547 | A1 * | 3/2012 | Lohr .................... H04L 5/0007 370/329 |
| 2014/0254505 | A1 * | 9/2014 | Chakravarthy ....... H04W 72/10 370/329 |
| 2015/0373605 | A1 * | 12/2015 | Kanamarlapudi .... H04L 1/0001 455/452.2 |

FOREIGN PATENT DOCUMENTS

| | | |
|---|---|---|
| EP | 1786133 A1 | 5/2007 |
| EP | 1898540 A1 | 3/2008 |
| EP | 2012552 A1 | 1/2009 |
| WO | 97/02665 A2 | 1/1997 |
| WO | 00/01084 A1 | 1/2000 |
| WO | 2009153165 A1 | 12/2009 |

OTHER PUBLICATIONS

Nokia Siemens Networks, "PUSCH Power Control for LTE-Advanced", 3GPP TSG RAN WG1 Meeting # 57bis, 4 pages, USA, Jun. 29-Jul. 3, 2009 .

3rd Generation Partnership Project; Technical Specification Group Radio Access Network; Radio Frequency (RF) System Scenarios (Release 5), 3GPP TR 25.942 V5.3.0 ,79 pages, Jun. 2004.

Nokia Siemens Networks, "Autonomous Component Carrier Selection for LTE Advanced", 3GPP TSG RAN WG1 Meeting #54, 4 pages, 18-22, 2008.

Nokia Siemens Networks, "Algorithms and Results for Autonomous Component Carrier Selection for LTE-Advanced", 3GPP TSG RAN WG1 Meeting #55, 5 pages, Nov. 10-14, 2008.

Nokia Siemens Networks, "Use of Background Interference Matrix for Autonomous Component Carrier Selection for LTE-Advanced", 3GPP TSG RAN WG1 Meeting #55-bis, 7 pages, Jan. 12-16, 2009.

Qualcomm Europe, "Notion of Anchor Carrier in LTE-A", 3GPP TSG RAN WG1 Meeting #55-bis, 5 pages, Jan. 12-16, 2009.

Samsung, "UL Transmission Power Control in LTE-A", 3GPP TSG RAN WG1 Meeting #56bis, 5 pages, Mar. 23-27, 2009

NTT Docomo et al., "Prioritized Deployment Scenarios for LTE-Advanced Studies", 3GPP TSG RAN WG4 Meeting #50, 5 pages, Feb. 9-13, 2009.

Nokia Siemens Networks, "LTE-Advanced SU-MIMO UE Transmission in LTE Release 8 Network", 3GPP TSG RAN WG1 Meeting #57, 2 pages, USA, May 4-8, 2009.

3rd Generation Partnership Project; Technical Specification Group Radio Access Network; Further Advancements for E-UTRA Physical Layer Aspects (Release 9), 3GPP TR 36.814 V0.4.1, 31 pages, Feb. 2009

3rd Generation Partnership Project; Technical Specification Group Radio Access Network; Evolved Universal Terrestrial Radio Access (E-UTRA); Physical Later Procedures (Release 8), Draft 3GPP TS 36.213 V8.6.0, 58 pages, 2009.

Huawei, "The Impact of CA on Mobility in LTE-A", 3GPP TSG RAN WG1 Meeting #56, 6 pages, Feb. 9-13, 2009.

3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913, V8.0.1, 2 pages, Mar. 2009.

3rd Generation Partnership Project; Technical Specification Group Radio Access Network; Evolved Universal Terrestrial Radio Access (E-UTRA); Physical layer procedures (Release 8), 3GPP TS 36.213 V8.4.0, 44 pages, Sep. 2008.

Nortel, "On the discussions of carrier aggregations", 3GPP TSG-RAN Working Group 1 Meeting #55, 5 pages, Nov. 10-14, 2008.

NTT Docomo, Inc., "Updated Views on Support of Wider Bandwidth in LTE-Advanced", 3GPP TSG RAN WG1 Meeting #54bis, 21 pages, Sep. 29-Oct. 3, 2008.

3rd Generation Partnership Project; Technical Specification Group Radio Access Network; User Equipment (UE) radio transmission and reception (FDD) (Release 8), 3GPP TS 25.101 V8.5.1, 214 pages, Jan. 2009.

Ericsson, "Carrier Aggregation in LTE-Advanced", TSG-RAN WG1 #53bis, 6 pages, Jun. 30-Jul. 4, 2008.

Alcatel-Lucent, "Fractional power Control using Pilot Power Ratio Measurements for the E-UTRA Uplink", 3GPP TSG-RAN WG1 #48, 11 pages, Feb. 12-16, 2007.

Motorola, "Uplink Power Control for E-UTRA", 3GPP TSG RAN1 #48, St. Louis, USA, 4 pages, Feb. 12-16, 2007.

Motorola, "Interference Mitigation via Power Control and FDM Resource Allocation and UE Alignment for E-UTRA Uplink and TP", 3GPP TSG RAN1 #44, 7 pages, Feb. 13-17, 2006

Rapporteur (NTT DOCoMo), "Text proposal for RAN1 TR on LTE-Advanced", 3GPP TSG RAN WG1 Meeting #53bis, 1 page, Jun. 30-Jul. 4, 2008.

Jarot et al., "Each Carrier Transmission Power Control for the Reverse Link of OFDM-DS-CDMA System", IEICE Transactions on Communications, vol. E82-B, No. 11, pp. 1851-1857, Nov. 1, 1999.

NTT Docomo, Inc., "Proposals for LTE-Advanced Technologies", 3GPP TSG RAN WG1 Meeting # 53, 29 pages, May 5-9, 2008.

3rd Generation Partnership Project (3GPP), "Technical Specification Group Radio Access Network; Medium Access Control (MAC) protocol specification", Release 12, TS 25.321, version 12.0.0, 207 pages, Jun. 2014.

3GPP TS 25.133, "Technical Specification Group Radio Access Network; Requirements for support of radio resource management (FDD)", Release 12, TS 25.133, version 12.0.0, 290 pages, Jul. 2013.

European Application # 09800142.3 Search Report dated Apr. 12, 2016.

(56) References Cited

OTHER PUBLICATIONS

Huawei., "Carrier aggregation in Advanced E-UTRA", 3GPP Draft; R1-082448, 3rd Generation Partnership Project (3GPP), Mobile Competence Centre, vol. RAN WG1, number Warsaw, Poland, 4 pages, Jun. 25, 2008.

Ericsson: "R1-082468 Carrier aggregation in LTE-Advanced", 3GPP TSG RAN WG1 Meeting 53BIS, Warsaw, Poland, 6 pages, Jun. 30, 2008.

* cited by examiner

OPTIMIZED TRANSMIT-POWER ALLOCATION IN MULTI-CARRIER TRANSMISSION

CROSS-REFERENCE TO RELATED APPLICATIONS

This application claims the benefit of U.S. Provisional Patent Application 62/089,404, filed Dec. 9, 2014, whose disclosure is incorporated herein by reference.

FIELD OF THE DISCLOSURE

The present disclosure relates generally to wireless communication, and particularly to methods and systems for allocation of transmission power.

BACKGROUND

Wireless communication terminals in Universal Mobile Telecommunications System (UMTS) networks typically transmit simultaneously on multiple channels of various types. One channel type is the Enhanced Dedicated Transport Channel (E-DCH) that is used for transmitting user data and signaling data in High-Speed Uplink Packet Access (HSUPA) networks.

Channel types for UMTS networks are specified by the $3^{rd}$ Generation Partnership Project (3GPP), for example in "Technical Specification Group Radio Access Network; Medium Access Control (MAC) protocol specification (Release 12)," TS 25.321, version 12.0.0, June, 2014; and in "Technical Specification Group Radio Access Network; Requirements for support of radio resource management (FDD) (Release 12)," TS 25.133, version 12.0.0, July, 2013, which are incorporated herein by reference.

The description above is presented as a general overview of related art in this field and should not be construed as an admission that any of the information it contains constitutes prior art against the present patent application.

SUMMARY

An embodiment that is described herein provides a method including, in a wireless communication terminal that transmits a data channel over multiple component carriers, dividing a total transmit-power allocation specified for the data channel into carrier-specific power allocations for the respective component carriers. Block sizes, which specify respective numbers of bits for transmitting the data channel, are initially derived for one or more of the component carriers from a quantized set of block sizes, such that the respective carrier-specific power allocations are not exceeded. For at least a selected component carrier, an extended block size is selected from the quantized set. The extended block size exceeds a carrier-specific power allocation assigned to the selected component carrier, but together with the block sizes of the other component carriers does not exceed the total transmit-power allocation. The data channel is transmitted over the component carriers using the selected block sizes, including the extended block size.

In some embodiments, selecting the extended block size includes calculating a total quantization loss between the total power allocation and a total transmit power of the multiple component carriers when using the initially-derived block sizes, and selecting the extended block size based on the total quantization loss. In an embodiment, the method further includes choosing the component carrier for which the block size is to be extended, based on the quantization loss and the initially-derived block sizes.

In another embodiment, the method further includes identifying the selected component carrier by identifying a component carrier whose block size will increase the most, among the component carriers, if allocated the total quantization loss. In yet another embodiment, the method further includes, after assigning the extended block size to the selected component carrier, updating the total quantization loss and the carrier-specific power allocation of the selected component carrier to account for the extended block size, and re-attempting to extend a block size of at least one of the component carriers. In an embodiment, transmitting the data channel includes transmitting an Enhanced Dedicated Transport Channel (E-DCH) in a High-Speed Uplink Packet Access (HSUPA) network.

There is additionally provided, in accordance with an embodiment that is described herein, an apparatus including a transmitter and a processor. The transmitter is configured to transmit a data channel over multiple component carriers. The processor is configured to divide a total transmit-power allocation specified for the data channel into carrier-specific power allocations for the respective component carriers, to initially derive for one or more of the component carriers respective block sizes that specify numbers of bits for transmitting the data channel, from a quantized set of block sizes, such that the respective carrier-specific power allocations are not exceeded, to select from the quantized set, for at least a selected component carrier, an extended block size that exceeds a carrier-specific power allocation assigned to the selected component carrier, but together with the block sizes of the other component carriers does not exceed the total transmit-power allocation, and to configure the transmitter to transmit the data channel over the component carriers using the selected block sizes, including the extended block size.

In some embodiment, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
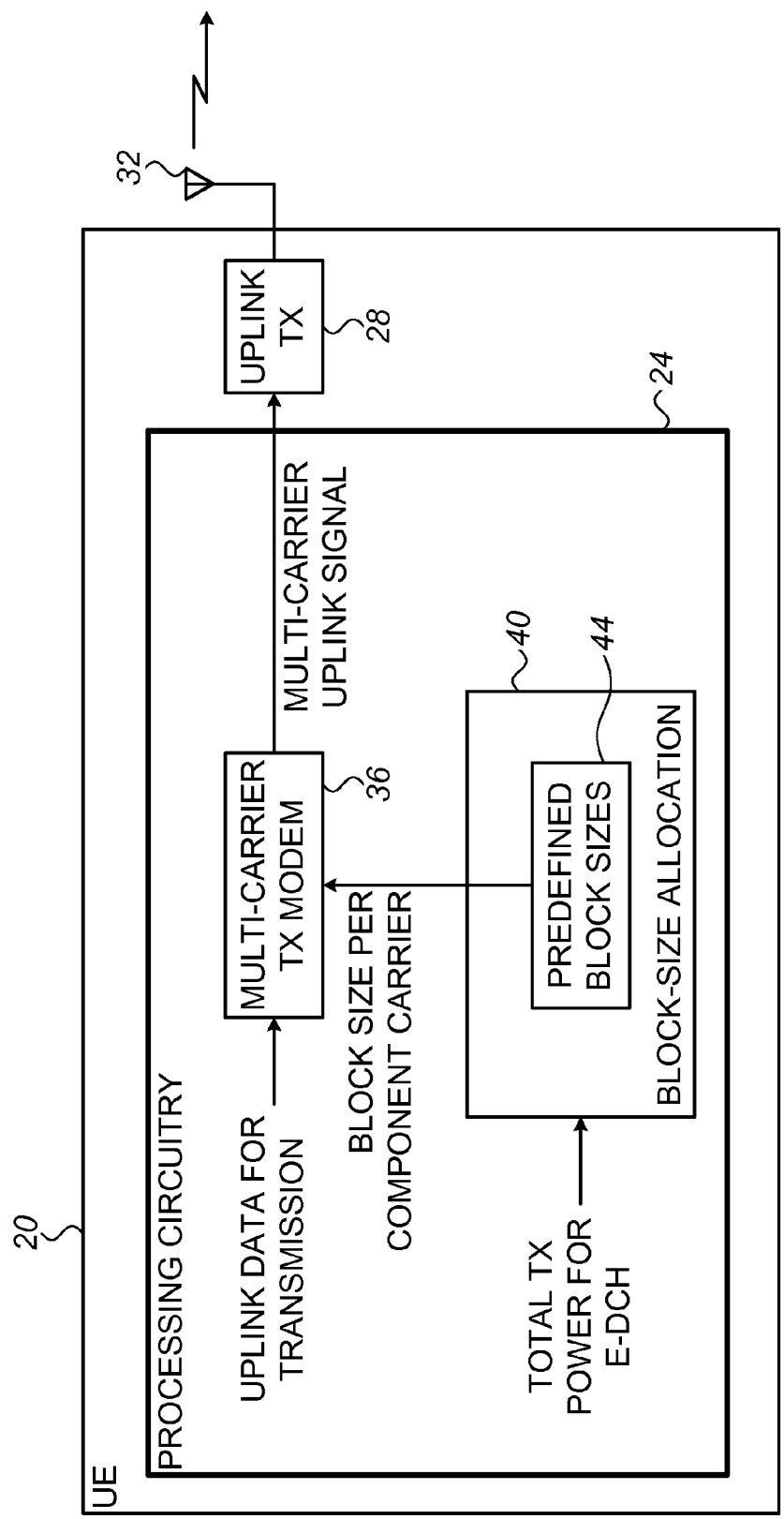
FIG. 1 is a block diagram that schematically illustrates a wireless communication terminal configured to transmit on multiple component carriers, in accordance with an embodiment that is described herein.

Embodiments that are described herein provide improved methods and apparatus for transmit-power allocation in transmitters that transmit aggregated-spectrum signals comprising multiple component carriers. The embodiments described herein refer mainly to Enhanced Dedicated Transport Channel (E-DCH) transmission in Universal Mobile Telecommunications System (UMTS) User Equipment (UE). The disclosed techniques, however, are applicable to various other types of data channels, networks and transmitters.

In some disclosed embodiments, a UE is configured to transmit various types of uplink channels over two or more component carriers. When preparing for transmission of a given Transmission Time Interval (TTI), the UE allocates the amount of data to be transmitted over each type of channel on each component carrier. As part of this process, the UE selects a suitable block size for E-DCH transmission of each component carrier, from a set of predefined block sizes. The block size assigned to a component carrier, also referred to as E-DCH Transport Format Combination Indicator (E-TFCI) indicates the number of E-DCH bits to be transmitted on that component carrier.

One possible allocation scheme is for the UE to (i) determine a total transmit power available for E-DCH transmission, (ii) divide the total transmit-power allocation into carrier-specific power allocations for the respective component carriers, and (iii) select for each component carrier a suitable E-DCH block size that does not exceed the corresponding carrier-specific power allocation. A high carrier-specific power allocation permits selection of a large block size, and vice versa. The 3GPP TS 25.321 specification, cited above, gives an explicit procedure for selecting the block size as a function of the carrier-specific power allocation.

In practice, however, the allocation scheme described above is suboptimal because the set of predefined block sizes is quantized. The set of predefined block sizes consists of a relatively small number of block sizes, and therefore does not enable selection of block size with high resolution. Due to this rough quantization, even if each component carrier is allocated the largest block size that does not exceed the corresponding carrier-specific power allocation, the resulting total transmit power (summed over all component carriers) will often be lower than the total transmit-power allocation.

The embodiments described herein provide improved allocation schemes, which enable the UE to more fully utilize the carrier-specific power allocations. In some embodiments, the UE initially allocates the block sizes to the component carriers as described above. Then, for at least a selected component carrier, the UE selects an extended block size that (i) exceeds the carrier-specific power allocation of that specific component carrier, but (ii) together with the block sizes of the other component carriers does not exceed the total transmit-power allocation.

In other words, the UE re-allocates some of the transmit power that was not allocated due to quantization, by extending the block size of a selected component carrier beyond the carrier-specific power allocation. At the same time, the UE verifies that the total transmit-power allocation is not exceeded.

In some embodiments, the selected component carrier is the component carrier that will benefit the most from extending its block size. In an embodiment, the UE selects this component carrier by (i) estimating the quantization loss, i.e., the power lost due to quantization of the block sizes, and (ii) finding the component carrier in which the number of E-DCH bits will increase the most if its carrier-specific power allocation were to be increased by the quantization loss.

FIG. 1 is a block diagram that schematically illustrates a wireless communication terminal 20 configured to transmit on multiple component carriers, in accordance with an embodiment that is described herein. In the present example, terminal 20 comprises a UE operating in accordance with the UMTS specifications cited above. UE 20 is configured to transmit uplink signals to a base station (not shown) on multiple UMTS component carriers simultaneously. Among the various channels supported, UE 20 is configured to transmit multiple E-DCH channels simultaneously on the respective component carriers.

In the embodiment of FIG. 1, UE 20 comprises processing circuitry 24, an uplink transmitter (TX) 28 and at least one antenna 32. Processing circuitry is also referred to herein as a UE processor. Processing circuitry 24 generates a multi-carrier baseband signal that comprises two or more component carriers having respective carrier frequencies. Transmitter 28 converts the multi-carrier baseband signal to a suitable Radio Frequency (RF), and transmits the RF signal via antenna 32.

In an embodiment, processing circuitry 24 comprises a multi-carrier TX modem 36 that is configured to accept data for uplink transmission, and to modulate the data onto the multiple component carriers. Typically, TX modem 36 prepares the data for transmission one Transmission Time Interval (TTI) at a time.

As part of the TTI preparation process, TX modem 36 formats multiple E-DCH blocks, each block to be transmitted on a respective component carrier. TX modem 36 combines the E-DCH blocks with any other channel types that are to be transmitted during the TTI, and generates a baseband multi-carrier signal in which each component carrier is modulated with the channels assigned thereto. The baseband multi-carrier signal is then provided to transmitter 28 for transmission.

In an embodiment, processing circuitry 24 further comprises a block-size allocation module 40 that is configured to specify the sizes of the E-DCH blocks transmitted over the various component carriers. Typically, block-size allocation module 40 accepts as input the total transmit-power allocation that is available for E-DCH transmission over all component carriers. Block-size allocation module 40 then allocates the block size for each component carrier from a list 44 of predefined block sizes, based on the carrier-specific power allocations.

For Category-6 and Category-8 UEs, for example, the largest block size for a 2 mS TTI is 11484 bits. For a 10 mS TTI in Category-6 and Category-8 UEs, the largest block size is 20000 bits. For Category-7 and Category-9 UE's, the largest block size is 22996 bits. List 44 in both cases has 127 valid block sizes. As such, there are often gaps of several hundred bits between adjacent block sizes. The block sizes are also referred to as E-DCH Transport Format Combination Indicators (E-TFCIs).

The effects of this quantization, and methods for block-size allocation that overcome these effects, are described in detail further below.

In an embodiment, block-size allocation module 40 notifies TX modem 36 of the E-DCH block sizes allocated on the respective component carriers in the TTI being prepared. TX modem 36 formats the data for transmission accordingly. The allocation process is typically performed per TTI, and the allocated block sizes may well change from one TTI to another.

The UE configuration shown in FIG. 1 is an example configuration, which is depicted solely for the sake of clarity. In alternative embodiments, any other suitable UE configuration can also be used. Some UE elements that are not mandatory for understanding of the disclosed techniques have been omitted from the figure for the sake of clarity. For example, since the disclosed techniques refer mainly to uplink transmission, UE elements relating to downlink reception have been omitted.

The different elements of UE 20 are typically implemented using dedicated hardware. For example, in an embodiment processing circuitry 24 (also referred to as UE processor) is implemented using one or more Application-Specific Integrated Circuits (ASICs) and/or Field-Programmable Gate Arrays (FPGAs), and uplink transmitter 28 is implemented using on or more RF Integrated Circuits (RFICs). Alternatively, some UE elements (e.g., block-size allocation module 40 or other elements of processing circuitry 24) may be implemented using software executing on programmable hardware, or using a combination of hardware and software elements. In some embodiments, some or all of the elements of processing circuitry 24 and transmitter 28 are fabricated in a chip-set.

When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

Figure 2:
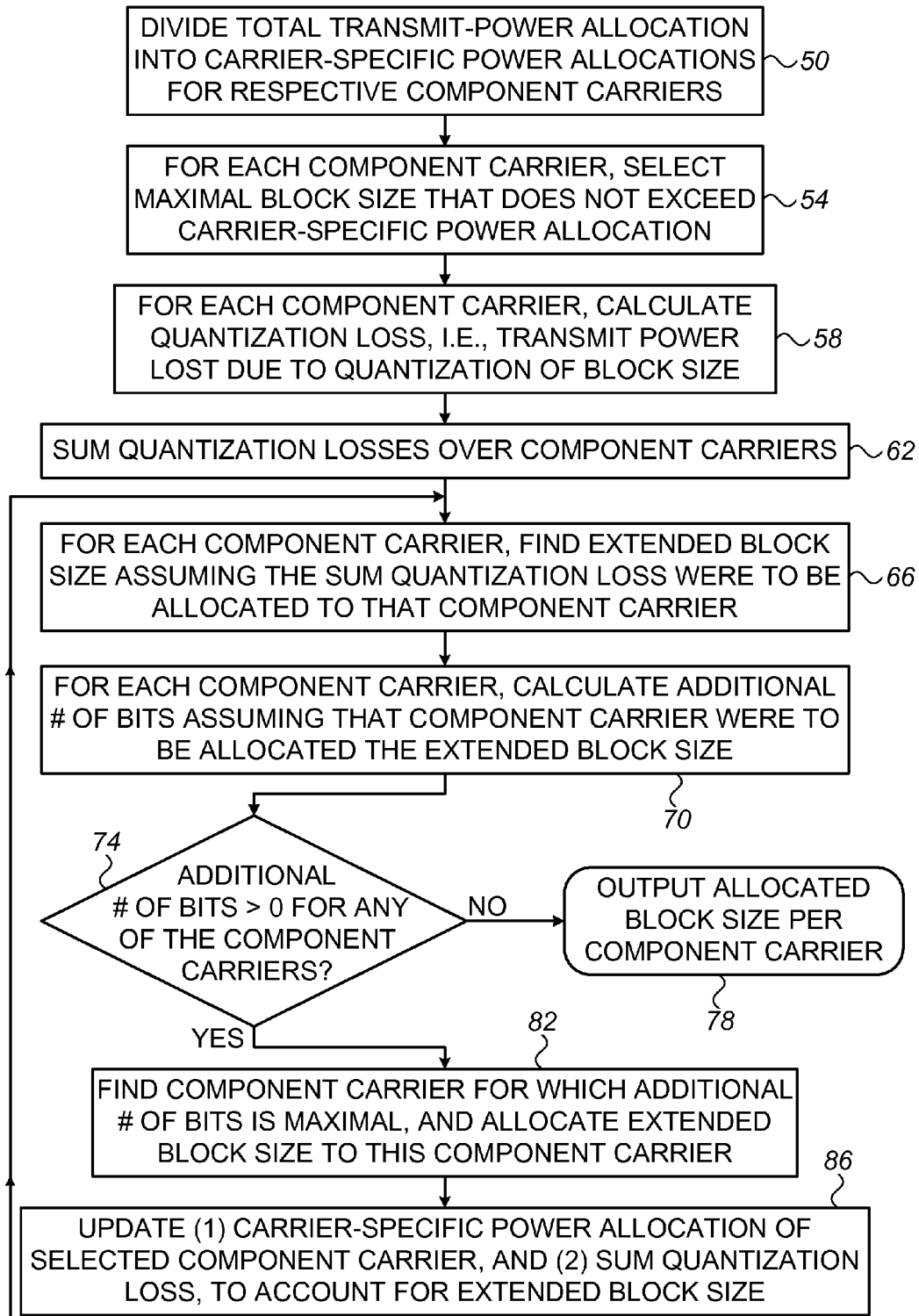
FIG. 2 is a flow chart that schematically illustrates a method for allocating transmit power to multiple component carriers, in accordance with an embodiment that is described herein.

FIG. 2 is a flow chart that schematically illustrates a method for allocating transmit power to multiple component carriers, carried out by block-size allocation module 40 in accordance with an embodiment that is described herein. As noted above, the method of FIG. 2 is typically repeated per TTI. Block-size allocation module 40 is referred to below as "module 40" for brevity.

For a given TTI, module 40 is provided with a total transmit-power allocation for E-DCH. This allocation is set for E-DCH transmission over the multi-carrier signal as a whole, and module 40 has the freedom to divide the total allocation among the component carriers in any suitable manner. The total transmit-power allocation for E-DCH is typically derived from the maximum power that the UE is permitted to transmit, after deducting allocations for other channel types and possibly various margins. The specific manner in which the UE determines the total transmit-power allocation is outside the scope of the present disclosure.

The method of FIG. 2 begins with module 40 dividing the total transmit-power allocation into carrier-specific power allocations set for the respective component carriers, at a division operation 50. The specific manner in which the total transmit-power allocation is divided among the component carriers is, too, outside the scope of the present disclosure.

At a block-size selection operation 54, module 40 selects a respective block size for each component carrier. The block-size selected for a component carrier defines the number of E-DCH bits that will be transmitted over this component carrier during the TTI being prepared.

Module 40 selects the block sizes from list 44, i.e., from a finite predefined set of block sizes. For each component carrier, module 40 selects from list 44 the largest block size that does not exceed the carrier-specific power allocation of the component carrier.

In order to make this selection, module 40 uses a suitable formula or procedure that accepts the carrier-specific power allocation as input, and returns an index of the largest block size in list 44 that, if used on the component carrier, will not exceed the carrier-specific power allocation. The selected block size is also referred to as selected E-DCH Transport Format Combination Indicator (E-TFCI). One example procedure for E-TFCI selection is given in section 6.4 of 3GPP TS 25.133, cited above. Alternatively, module 40 may use any other suitable formula or calculation procedure.

At a quantization-loss calculation operation 58, module 40 calculates the quantization loss per component carrier. The quantization loss of a component carrier is defined as the amount of transmission power lost due to the fact that the block size of the component carrier is selected from a quantized set of possible block sizes having finite resolution.

Module 40 typically performs this calculation using a suitable formula or procedure that accepts the selected block size (selected E-TFCI) as input, and returns the actual transmission power needed for transmitting the selected block size. One example procedure for deriving the actual transmission power from the selected E-TFCI is given in section 6.4 of 3GPP TS 25.133, cited above. Alternatively, module 40 may use any other suitable formula or calculation procedure. Module 40 calculates the quantization loss, per component carrier, by subtracting the actual transmission power (obtained using the above formula or procedure) from the carrier-specific power allocation.

As a summation operation 62, module 40 sums the quantization losses over the multiple component carriers. The sum indicates the total loss of transmission power, over the entire multi-carrier signal, caused by the quantization of the block sizes on the various component carriers.

Module 40 now begins an iterative process for determining block sizes for the component carriers. The iterative process attempts to extend the block size of one or more of the component carriers in a manner that, although the carrier-specific power allocation of a specific component carrier is exceeded in some cases, the total transmit-power allocation specified for the entire multi-carrier signal is not exceeded. Extending the block size is made possible by re-allocating some or all of the quantization loss caused by block-size quantization to one or more of the component carriers. It is noted that this extension is not always possible, and that in some cases the method terminates without extending any of the block sizes.

At an extension operation 66, module 40 finds, for each component carrier, the block size that would have been allocated to the component carrier if the entire total quantization loss were to be added to the carrier-specific power allocation of that component carrier. This block size is referred to as an extended block size. Module 40 typically finds the extended block size for a given component carrier by providing the total quantization loss, plus the carrier-specific power allocation, to the formula or procedure used in operation 54 above.

At a bit addition calculation operation 70, module 40 calculates, for each component carrier, the number of additional E-DCH bits that would be transmitted on the component carrier if the component carrier were to use the extended block size.

In cases in which module 40 is able to assign an extended block size to a component carrier, the additional number of bits for the component carrier will be some positive number. In other cases, module 40 will not be able to extend the block size of a component carrier.

For example, the block size initially assigned to the component carrier may already be the largest block size on list 44. As another example, the total quantization loss may be too small to permit allocating the next-larger block size on list 44. In other words, allocating the next-larger block size to the component carrier would cause the multi-carrier signal as a whole to exceed the total transmit-power allocation. In the latter cases, the additional number of bits for the component carrier will be zero.

At an extension checking operation 74, module 40 checks whether the additional number of bits is positive for any of the component carriers. If not, module 40 notifies TX modem 36 of the current block sizes, at a termination operation 78, and the method terminates.

Otherwise, i.e., if the additional number of bits is positive for at least one component carrier, module 40 extends the block size of the component carrier for which the additional number of bits is maximal, at a block-size extension operation 82. Having identified the component carrier for which the additional number of bits is maximal, module 40 assigns this component carrier the extended block size found at operation 66 above.

At an updating operation 86, module 40 updates (i) the carrier-specific power allocation of the component carrier whose block size was extended, and (ii) the total quantization loss, such that both account for the extended block size. Module 40 typically uses the procedure used at operation 58 for this purpose.

The method then loops back to operation 66 above, and module 40 attempts to further extend the block size of one or more of the component carriers. Since the total quantization loss becomes smaller with each iteration, the probability of successfully extending the block size is smaller. Nevertheless, in many cases it is possible to perform more than one iterations. In this manner, module 40 is able to minimize the quantization loss and approach the total transmit-power allocation.

Although the embodiments described herein mainly address multi-carrier E-DCH transmission in UMTS UEs, the methods and systems described herein can be used with any other multi-carrier communication scheme that involves selection of block sizes from a finite, quantized set of possible block sizes.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a wireless communication terminal that transmits a data channel over multiple component carriers, comprising at least three component carriers, dividing a total transmit-power allocation specified for the data channel into carrier-specific power allocations for the respective component carriers;
   initially deriving for one or more of the component carriers respective block sizes that specify numbers of bits for transmitting the data channel, from a quantized set of block sizes, such that the respective carrier-specific power allocations are not exceeded;
   for at least a selected component carrier, selecting from the quantized set an extended block size that exceeds a carrier-specific power allocation assigned to the selected component carrier, but together with the block sizes of the other component carriers does not exceed the total transmit-power allocation, by:
   calculating a total quantization loss between the total power allocation and a total transmit power of the multiple component carriers when using the initially-derived block sizes; and
   selecting the extended block size based on the total quantization loss; and
   transmitting the data channel over the component carriers using the selected block sizes, including the extended block size.

2. The method according to claim 1, further comprising choosing the component carrier for which the block size is to be extended, based on the quantization loss and the initially-derived block sizes.

3. The method according to claim 1, comprising identifying the selected component carrier by identifying a component carrier whose block size will increase the most, among the component carriers, if allocated the total quantization loss.

4. The method according to claim 1, further comprising, after assigning the extended block size to the selected component carrier, updating the total quantization loss and the carrier-specific power allocation of the selected component carrier to account for the extended block size, and re-attempting to extend a block size of at least one of the component carriers.

5. The method according to claim 1, wherein transmitting the data channel comprises transmitting an Enhanced Dedicated Transport Channel (E-DCH) in a High-Speed Uplink Packet Access (HSUPA) network.

6. Apparatus, comprising:
   a transmitter, configured to transmit a data channel over multiple component carriers, comprising at least three component carriers; and
   a processor, configured to:
   divide a total transmit-power allocation specified for the data channel into carrier-specific power allocations for the respective component carriers;
   initially derive for one or more of the component carriers respective block sizes that specify numbers of bits for transmitting the data channel, from a quantized set of block sizes, such that the respective carrier-specific power allocations are not exceeded;
   select from the quantized set, for at least a selected component carrier, an extended block size that exceeds a carrier-specific power allocation assigned to the selected component carrier, but together with the block sizes of the other component carriers does not exceed the total transmit-power allocation, by:
   calculating a total quantization loss between the total power allocation and a total transmit power of the multiple component carriers when using the initially-derived block sizes; and
   selecting the extended block size based on the total quantization loss; and
   configure the transmitter to transmit the data channel over the component carriers using the selected block sizes, including the extended block size.

7. The apparatus according to claim 6, wherein the processor is configured to choose the component carrier for which the block size is to be extended, based on the quantization loss and the initially-derived block sizes.

8. The apparatus according to claim 6, wherein the processor is configured to identify the selected component carrier by identifying a component carrier whose block size will increase the most, among the component carriers, if allocated the total quantization loss.

9. The apparatus according to claim 6, wherein, after assigning the extended block size to the selected component carrier, the processor is configured to update the total quantization loss and the carrier-specific power allocation of the selected component carrier to account for the extended block size, and to re-attempt to extend a block size of at least one of the component carriers.

10. The apparatus according to claim 6, wherein the transmitter is configured to transmit the data channel by transmitting an Enhanced Dedicated Transport Channel (E-DCH) in a High-Speed Uplink Packet Access (HSUPA) network.

11. A mobile communication terminal comprising the apparatus of claim 6.

12. A chipset for processing signals in a mobile communication terminal, comprising the apparatus of claim 6.

* * * * *